United States Patent
Kuramitsu et al.

(10) Patent No.: US 11,437,664 B2
(45) Date of Patent: Sep. 6, 2022

(54) BATTERY MODULE

(71) Applicant: Panasonic Intellectual Property Management Co., Ltd., Osaka (JP)

(72) Inventors: Kazuki Kuramitsu, Osaka (JP); Toshiya Gotou, Osaka (JP); Kazunari Hiraide, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 16/639,700

(22) PCT Filed: Sep. 3, 2018

(86) PCT No.: PCT/JP2018/032519
§ 371 (c)(1),
(2) Date: Feb. 17, 2020

(87) PCT Pub. No.: WO2019/058937
PCT Pub. Date: Mar. 28, 2019

(65) Prior Publication Data
US 2020/0411922 A1  Dec. 31, 2020

(30) Foreign Application Priority Data
Sep. 22, 2017  (JP) .............................. JP2017-182819

(51) Int. Cl.
*H01M 10/613* (2014.01)
*H01M 10/647* (2014.01)
(Continued)

(52) U.S. Cl.
CPC ....... *H01M 10/613* (2015.04); *H01M 10/647* (2015.04); *H01M 10/659* (2015.04);
(Continued)

(58) Field of Classification Search
CPC ............. H01M 10/613; H01M 10/647; H01M 10/6551; H01M 10/6554; H01M 10/6555; H01M 10/659; H01M 50/20; Y02E 60/10
See application file for complete search history.

(56) References Cited

U.S. PATENT DOCUMENTS

2004/0137323 A1* 7/2004 Sato .................. H01M 50/1243
429/185
2011/0064983 A1* 3/2011 Yokoyama .......... H04M 1/0262
429/100
(Continued)

FOREIGN PATENT DOCUMENTS

| JP | 2012-181972 | 9/2012 |
|---|---|---|
| JP | 2012-248339 A | 12/2012 |
| WO | 2010/032484 A1 | 3/2010 |

OTHER PUBLICATIONS

International Search Report of PCT application No. PCT/JP2018/032519 dated Sep. 25, 2018.

*Primary Examiner* — Lingwen R Zeng
(74) *Attorney, Agent, or Firm* — McDermott Will & Emery LLP (57) ABSTRACT

A battery module includes a battery stack having a plurality of batteries that are stacked and a heat transfer suppression member disposed between adjacent two of the batteries, a heat conductor that extends in stacking direction X of the batteries and is adjacent to the battery stack, and a heat absorber that intervenes between the battery stack and the heat conductor and contains an endothermic agent that is to start endothermic reaction at a temperature higher than or equal to a predetermined temperature.

11 Claims, 6 Drawing Sheets

(51) Int. Cl.
  *H01M 10/6554* (2014.01)
  *H01M 10/6551* (2014.01)
  *H01M 10/659* (2014.01)
  *H01M 50/20* (2021.01)
  *H01M 10/6555* (2014.01)

(52) U.S. Cl.
  CPC ... *H01M 10/6551* (2015.04); *H01M 10/6554* (2015.04); *H01M 50/20* (2021.01); *H01M 10/6555* (2015.04); *Y02E 60/10* (2013.01)

(56) References Cited

U.S. PATENT DOCUMENTS

2012/0301769 A1* 11/2012 Okada ............... H01M 10/6554
　　　　　　　　　　　　　　　　　　　　　　　　429/120
2016/0043429 A1* 2/2016 Hatta ................ H01M 10/0565
　　　　　　　　　　　　　　　　　　　　　　　　429/188

* cited by examiner

BATTERY MODULE

TECHNICAL FIELD

The present invention relates to a battery module.

BACKGROUND ART

Some power sources, such as power sources for vehicles, require high output voltage. As such a power source, a battery module having a structure with a plurality of batteries connected in series is known. PTL 1 discloses a battery module having a structure in which batteries and separators are alternately stacked. By disposing a separator between two adjacent batteries, the two batteries can be insulated from each other.

CITATION LIST

Patent Literature

PTL 1: Unexamined Japanese Patent Publication No. 2012-181972

SUMMARY OF THE INVENTION

The above-mentioned battery module has a risk of occurrence of a chain of overheat. Specifically, there is a possibility that a temperature of one battery rises excessively during use, the heat of the battery transmits to an adjacent battery, and a temperature of this adjacent battery also rises excessively. The chain of overheat causes a large decrease in performance of the battery module. As a result of diligent studies on the above-mentioned battery module, the inventors of the present invention have found that a conventional battery module has room for improvement in suppression of the performance deterioration of the battery module.

The present invention has been accomplished in light of this situation. An object of the present invention is to provide a technique for suppressing performance deterioration of a battery module.

An aspect of the present invention is a battery module. The battery module includes a battery stack having a plurality of batteries that are stacked and a heat transfer suppression member disposed between adjacent two of the batteries, a heat conductor that extends in a stacking direction of the batteries and is adjacent to the battery stack, and a heat absorber that intervenes between the battery stack and the heat conductor and contains an endothermic agent that is to start endothermic reaction at a temperature higher than or equal to a predetermined temperature.

According to the present invention, it is possible to suppress performance deterioration of a battery module.

DESCRIPTION OF EMBODIMENTS

Hereinafter, the present invention will be described based on preferred exemplary embodiments with reference to the drawings. The exemplary embodiments are examples and do not limit the invention. Features described in the exemplary embodiments and combinations of the features are not all necessarily essential to the invention. The same reference marks are assigned to the same or equivalent configuration elements, members, and processes illustrated in the drawings, and a duplicate description will be appropriately omitted. Further, scales or shapes of parts illustrated in the drawings are conveniently set for the sake of easy understanding, and should not be interpreted as limitation unless particularly mentioned. In some cases, even the same members may slightly differ in scale or the like between the drawings. Terms "first", "second", and the like, when used in the present description or claims, do not mean any order or importance unless particularly mentioned, and are used for distinguish between one configuration and another configuration.

First Exemplary Embodiment

Figure 1:
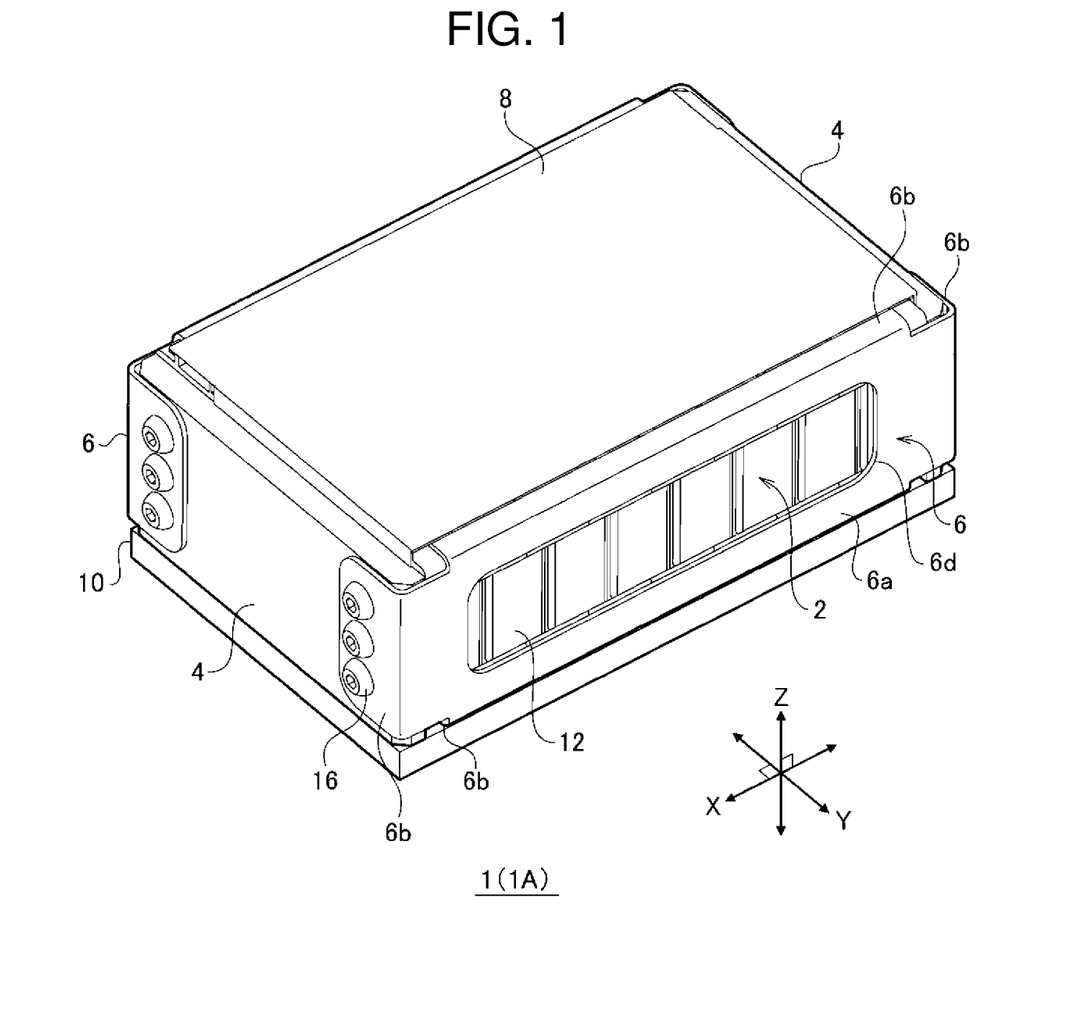
FIG. 1 is a schematic perspective view illustrating a structure of a battery module according to a first exemplary embodiment.
Figure 2:
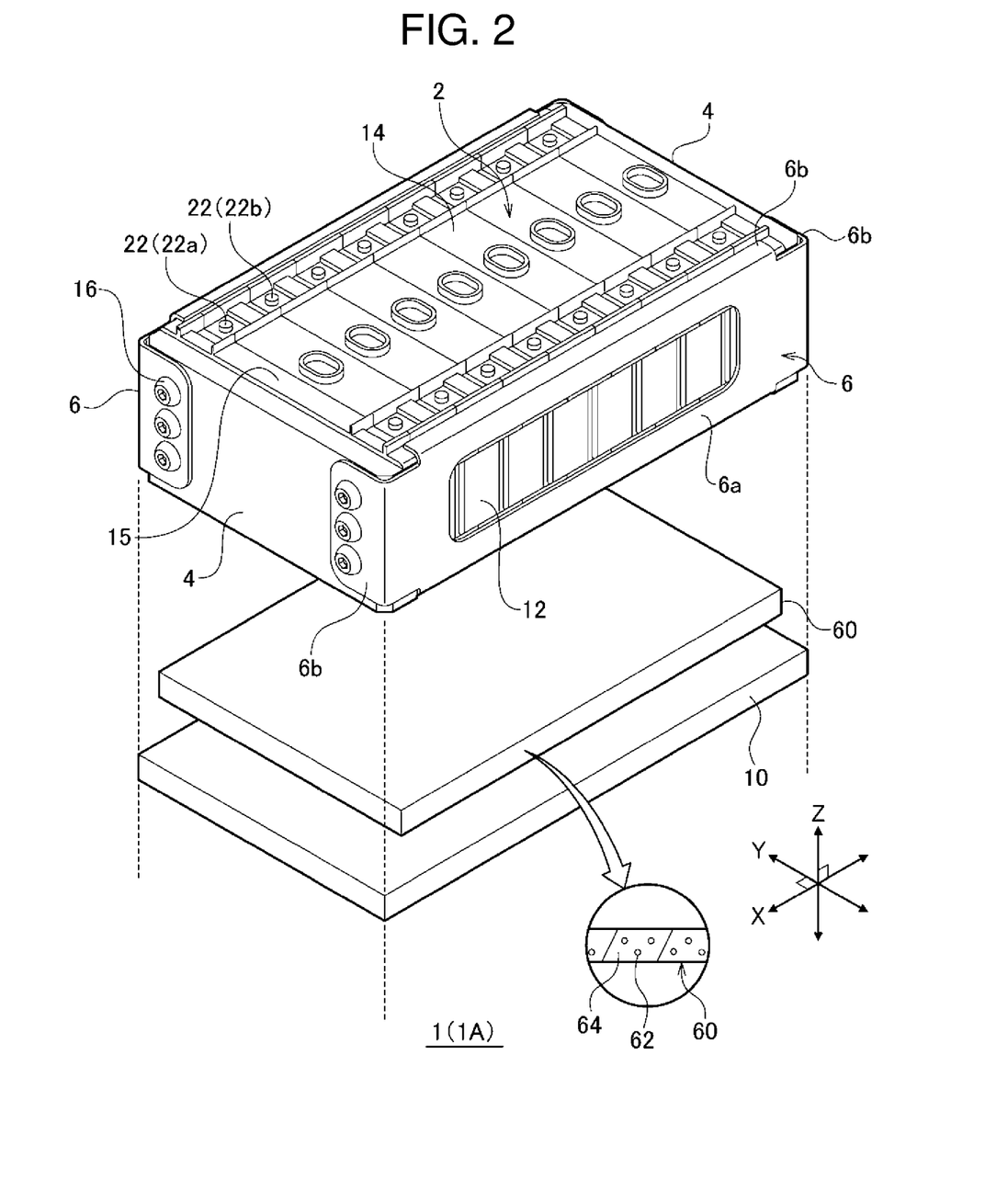
FIG. 2 is an exploded perspective view of the battery module.

FIG. 1 is a schematic perspective view illustrating a structure of a battery module according to a first exemplary embodiment. FIG. 2 is an exploded perspective view of the battery module. Note that illustration of cover 8 is omitted in FIG. 2. Battery module 1 (1A) mainly includes battery stack 2, a pair of end plates 4, a pair of restraint members 6, cover 8, cooling plate 10, and heat absorber 60.

Figure 4:
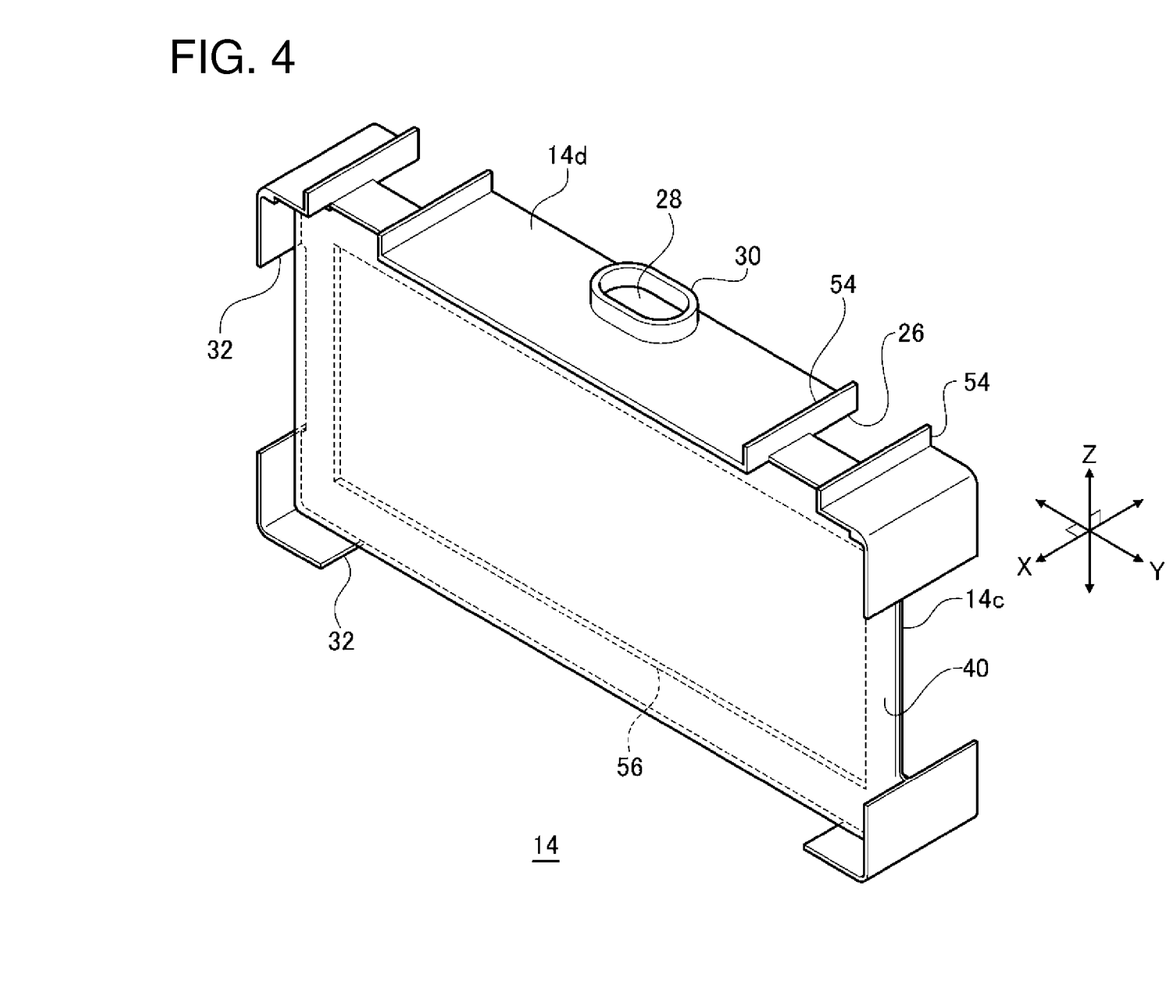
FIG. 4 is a schematic perspective view illustrating a structure of a separator and a heat transfer suppression member.

Battery stack 2 includes a plurality of batteries 12, a plurality of separators 14, and a plurality of heat transfer suppression members 40 (see FIG. 4). For example, eight batteries 12 are connected in series with bus bars (not illustrated) to form battery stack 2 in the present exemplary embodiment.

Each battery 12 is a rechargeable secondary battery such as a lithium ion battery, a nickel metal hydride battery, or a nickel-cadmium battery, for example. Battery 12 is a so-called prismatic (=rectangular) battery. The plurality of batteries 12 are stacked such that main surfaces of adjacent batteries 12 face each other. Note that the term "stack" means an arrangement of a plurality of members in any one direction. Thus, the stack of batteries 12 also includes an arrangement of the plurality of batteries 12 in a horizontal direction.

Two adjacent batteries 12 are arrayed such that positive-electrode output terminal 22 (positive-electrode terminal 22a) of one battery 12 is adjacent to negative-electrode output terminal 22 (negative-electrode terminal 22b) of the other battery 12. Hereinafter, when there is no need to distinguish polarities of output terminals 22, positive-electrode terminal 22a and negative-electrode terminal 22b are collectively referred to as output terminals 22. Positive-electrode terminal 22a and negative-electrode terminal 22b that are adjacent to each other are electrically connected in series via a bus bar. In some cases, output terminals 22 of the same polarity of two adjacent batteries 12 may be connected to each other via the bus bar.

Separator 14 is also called an insulating spacer and is made of resin having an insulation property, for example. Separator 14 is disposed between two adjacent batteries 12 to electrically insulate these two adjacent batteries 12 from each other. Examples of the resin constituting separator 14 include thermoplastic resins such as polypropylene (PP), polybutylene terephthalate (PBT), polycarbonate (PC), and Noryl (registered trademark) resin (modified Polyphenyleneether (PPE)).

Heat transfer suppression member 40 is disposed between two adjacent batteries 12 to suppress heat transfer between two batteries 12. Heat transfer suppression member 40 also has an insulation property. Heat transfer suppression member 40 is attached to separator 14 (see FIG. 4).

The plurality of batteries 12, the plurality of separators 14, and the plurality of heat transfer suppression members 40 that are stacked together are held between the pair of end plates 4. The pair of end plates 4 is disposed on both ends of battery stack 2 in stacking direction X of batteries 12 (a direction indicated by arrow X in FIGS. 1 and 2). End plate 4 is made of a metal sheet, for example. A main surface of end plate 4 is provided with screw holes (not illustrated) into which fastening screws 16 are screwed. End separator 15 without heat transfer suppression member 40 is disposed between end plate 4 and battery 12 adjacent to end plate 4. Consequently, battery 12 and end plate 4 are insulated from each other. End separator 15 is constituted by the same resin material as separator 14, for example.

The pair of restraint members 6 is also called binding bars and arrayed in horizontal direction Y (a direction indicated by arrow Y in FIGS. 1 and 2) perpendicular to stacking direction X of batteries 12. Battery stack 2 and the pair of end plates 4 are disposed between the pair of restraint members 6. Restraint member 6 includes rectangular plane part 6a parallel to a side surface of battery stack 2 and eaves parts 6b protruding from ends of sides of plane part 6a toward battery stack 2. Restraint member 6 can be formed by folding each side of a rectangular metal sheet, for example. Restraint member 6 holds the plurality of batteries 12, separators 14, and heat transfer suppression members 40 from both ends in stacking direction X.

Two eaves parts 6b facing each other in stacking direction X of batteries 12 are provided with through-holes (not illustrated) through which fastening screws 16 are inserted. Plane part 6a is provided with opening 6d for exposing the side surface of battery stack 2. Opening 6d is preferably disposed such that influence on rigidity of restraint member 6 against external force in stacking direction X of batteries 12 is reduced to minimum. This configuration allows for reduction in weight of restraint member 6 while maintaining the rigidity of restraint member 6. Restraint member 6 may be provided with a plurality of openings as needed.

Cover 8 is also called a top cover and disposed to overlap battery stack 2 in vertical direction Z (a direction indicated by arrow Z in FIGS. 1 and 2). Cover 8 is disposed at a side of battery stack 2 from which output terminals 22 of batteries 12 protrude. Cover 8 is a plate-like member that has a shape corresponding to a shape of a top surface of battery stack 2. Cover 8 prevents dew condensation water, dust, and the like from touching output terminals 22 of batteries 12, the bus bars, valves 24 described later, or the like. Cover 8 is made of resin having an insulation property, for example. Examples of the resin constituting cover 8 include thermoplastic resins such as polypropylene (PP) and polybutylene terephthalate (PBT). Cover 8 can be fixed to the top surface of battery stack 2 with a publicly known fixing structure (not illustrated) including a screw or a publicly known locking mechanism. Cover 8 may have a structure in which cover 8 holds an upper part of battery stack 2 between both ends of cover 8 to be fixed to battery stack 2.

Cooling plate 10 is a mechanism for cooling the plurality of batteries 12. Cooling plate 10 is constituted by a material having a heat transfer property such as a metal. Battery stack 2 is disposed on a main surface of cooling plate 10. Thus, cooling plate 10 is a heat conductor that extends in stacking direction X of batteries 12 and is adjacent to battery stack 2. Batteries 12 are cooled by heat exchange with cooling plate 10. Cooling plate 10 may be provided with a refrigerant pipe (not illustrated) through which a refrigerant flows.

Heat absorber 60 is a flat-plate-like member that intervenes between cooling plate 10 as a heat conductor and battery stack 2. Heat absorber 60 also intervenes between battery stack 2 and end plate 4 in the present exemplary embodiment (see FIG. 5). As shown in the cross-sectional view of heat absorber 60 in FIG. 2, heat absorber 60 contains endothermic agent 62 that is to start endothermic reaction at a temperature higher than or equal to a predetermined temperature. For example, heat absorber 60 has a structure in which endothermic agent 62 is filled in sheet-like or gel-like heat conductive material 64. Examples of endothermic agent 62 include aluminum hydroxide (an endothermic onset(=start) temperature of about 200° C.), sodium hydrogen carbonate (an endothermic onset temperature of about 130° C.), magnesium hydroxide (an endothermic onset temperature of about 370° C.), and the like. Examples of heat conductive material 64 include silicon rubbers or gel having a heat conductivity of 2 W/m·K or higher, acrylic rubbers or gel having a heat conductivity of 1.5 W/m·K or higher, and the like.

Battery module 1 is assembled as follows, for example. First, heat transfer suppression member 40 is attached to separator 14. A method of attaching heat transfer suppression member 40 will be described in detail later. Subsequently, the plurality of separators 14 having heat transfer suppression members 40 and the plurality of batteries 12 are alternately arrayed to form battery stack 2. Battery stack 2 is then held between the pair of end plates 4 and an assemblage is formed. The pair of restraint members 6 is attached to this assemblage. The assemblage partly enters a space surrounded by four eaves parts 6b of each restraint member 6. Each restraint member 6 is aligned such that the through-holes of restraint member 6 overlap the screw holes of end plate 4. In this state, fastening screws 16 are inserted through the through-holes and screwed into the screw holes. As a result, battery stack 2 is fastened by the pair of end plates 4 and the pair of restraint members 6.

Restraint members 6 fasten the plurality of batteries 12 in stacking direction X of batteries 12. This configuration determines a position of the plurality of batteries 12 in stacking direction X. Further, bottom surfaces of batteries 12 are in contact with lower eaves parts 6b of restraint members 6 via separators 14, and top surfaces of batteries 12 are in contact with upper eaves parts 6b of restraint members 6 via separators 14. This configuration determines the position of the plurality of batteries 12 in a vertical direction. In this state, the bus bars are electrically connected to output terminals 22 of batteries 12 and hence battery stack 2 is obtained. Then, cover 8 is attached to the top surface of battery stack 2. Battery module 1 is obtained through the above-described process.

Figure 3:
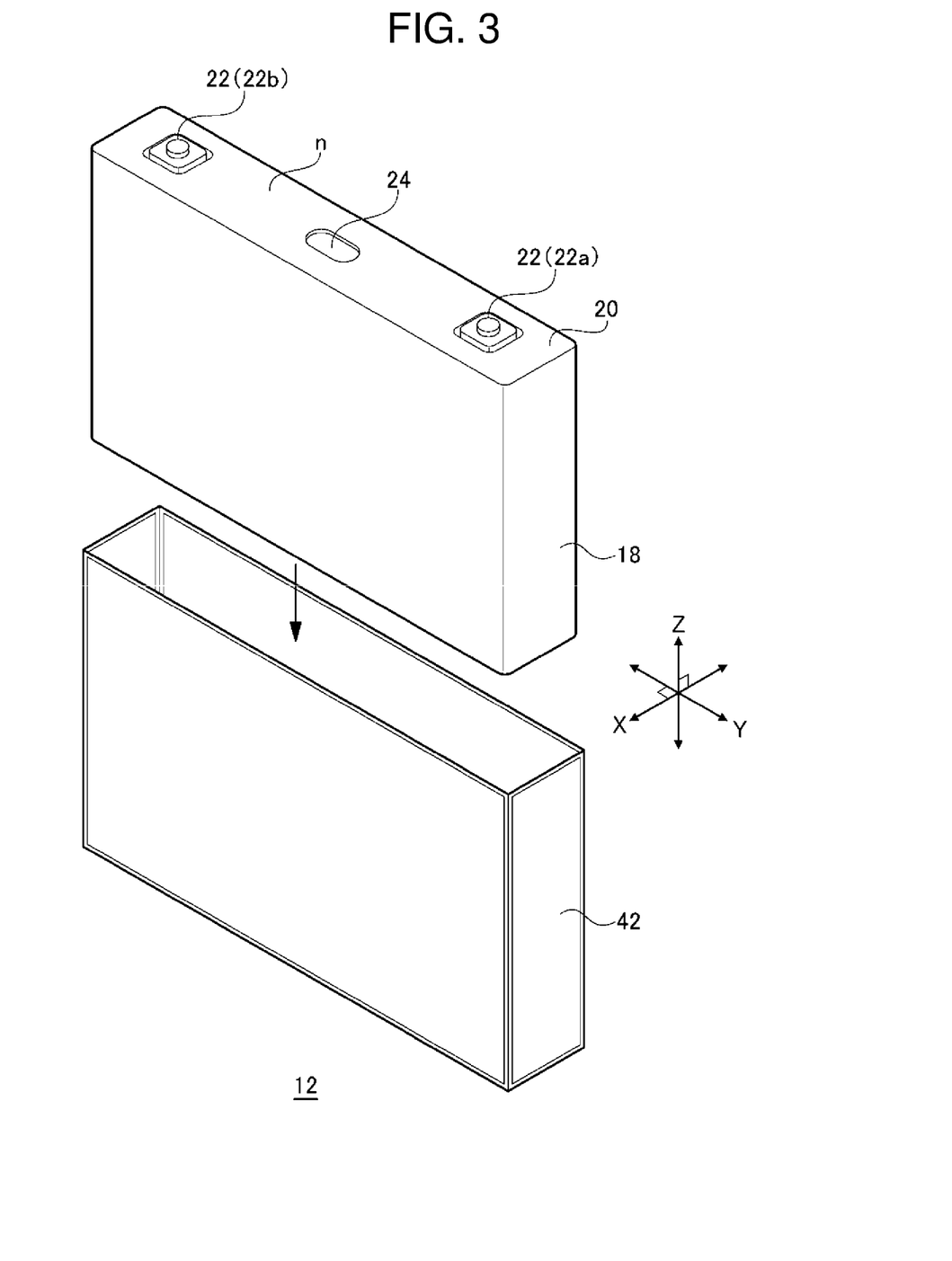
FIG. 3 is a schematic perspective view illustrating a structure of a battery.

Subsequently, structures of battery 12, separator 14, and heat transfer suppression member 40 and position of heat absorber 60 will be described in detail. FIG. 3 is a schematic perspective view illustrating a structure of battery 12. Battery 12 has exterior can 18 with a flat rectangular-parallelepiped shape. A substantially rectangular opening is formed in one surface of exterior can 18. An electrode assembly, an electrolyte, and the like are put into exterior can 18 through this opening. The opening of exterior can 18 is provided with sealing plate 20 for sealing an inside of exterior can 18. Sealing plate 20 is provided with positive-electrode terminal 22a near one end of sealing plate 20 in a longitudinal direction, and negative-electrode terminal 22b near the other end. Sealing plate 20 and output terminals 22 constitute a sealing body. Exterior can 18, sealing plate 20, and output terminals 22 are electric conductors and are made of metal, for example.

In the present exemplary embodiment, a side on which the sealing body is set is assumed as top surface n of battery 12, and the opposite side is assumed as a bottom surface of battery 12. Battery 12 includes two main surfaces that connect top surface n with the bottom surface. The main surfaces have the largest area among six surfaces of battery 12. Two remaining surfaces other than top surface n, the bottom surface, and the two main surfaces serve as side surfaces of battery 12. A top-surface n side of batteries 12 serves as a top surface of battery stack 2, and a bottom-surface side of batteries 12 serves as a bottom surface of battery stack 2. For convenience, the top-surface side of battery stack 2 is assumed as an upside in the vertical direction, and the bottom-surface side of battery stack 2 is assumed as a downside in the vertical direction.

Battery 12 has valve 24 on a surface for releasing gas generated within battery 12. Valve 24 is disposed between a pair of output terminals 22 of sealing plate 20 in the present exemplary embodiment. Valve 24 is configured to open and release gas within exterior can 18 when internal pressure of exterior can 18 rises to a predetermined value or higher. Valve 24 is also called a safety valve or a vent.

Battery 12 also includes insulating film 42. For example, insulating film 42 is a heat-shrink tube and is heated after exterior can 18 is stored in insulating film 42. Consequently, insulating film 42 shrinks and coats surfaces of exterior can 18. Insulating film 42 can prevent a short circuit between adjacent batteries 12, or between battery 12 and end plate 4 or restraint member 6.

Figure 5:
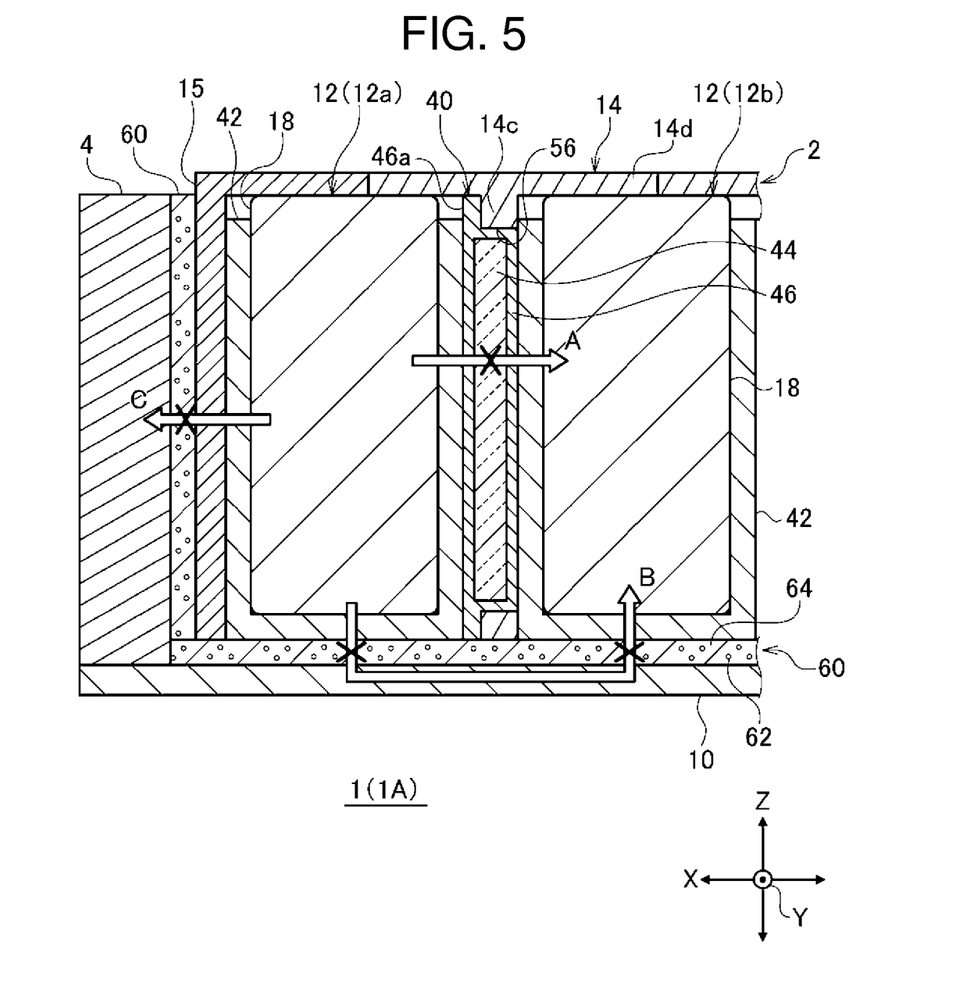
FIG. 5 is a cross-sectional view schematically illustrating a part of the battery module.

FIG. 4 is a schematic perspective view illustrating a structure of separator 14 and heat transfer suppression member 40. FIG. 5 is a cross-sectional view schematically illustrating a part of battery module 1. Hereinafter, two batteries 12 shown in FIG. 5 are referred to as battery 12a and battery 12b when distinguished. FIG. 5 does not illustrate an internal structure of battery 12 and cover 8.

Separator 14 includes first part 14c that extends between two batteries 12 and second part 14d that extends from an edge of first part 14c toward battery 12 sides, i.e., in stacking direction X. First part 14c has a substantially rectangular plate shape and extends between main surfaces of adjacent batteries 12. In this way, exterior cans 18 of adjacent batteries 12 are insulated from each other. Second part 14d covers top surfaces n, bottom surfaces, and side surfaces of battery 12. This configuration can prevent a short circuit between adjacent batteries 12 which can be caused by, for example, dew condensation on a surface of battery 12 or end plate 4.

Second part 14d has cutouts 26 at positions corresponding to output terminals 22 such that output terminals 22 are exposed to the outside. Second part 14d also has opening 28 at a position corresponding to valve 24 such that valve 24 is exposed to the outside. An edge of opening 28 has barrier 30 protruding toward cover 8. Second part 14d has cutouts 32 at positions corresponding to the side surfaces and bottom surfaces of batteries 12 such that parts of the side surfaces and bottom surfaces of batteries 12 are exposed. In assembled battery module 1, second part 14d is positioned between restraint member 6 and batteries 12. This configuration can prevent restraint member 6 from touching battery 12.

Separator 14 includes supports 54 that protrude toward cover 8 to support cover 8. Supports 54 are included in second part 14d. In the present exemplary embodiment, a pair of supports 54 is disposed at both ends of cutout 26. The pair of supports 54 aligned in horizontal direction Y across cutout 26 defines an installation position for a bus bar. Separator 14 also has through-hole 56. Through-hole 56 is disposed in first part 14c and passes through first part 14c in stacking direction X. Through-hole 56 has a substantially rectangular opening shape and is disposed in a substantially central part of first part 14c. Accordingly, first part 14c has a frame shape. Heat transfer suppression member 40 is fit in through-hole 56.

Heat transfer suppression member 40 has a sheet shape and includes heat insulating material 44 and laminate film 46. A thickness of heat transfer suppression member 40 is, for example, 1 mm to 2 mm. Heat insulating material 44 has a sheet shape and has a structure in which a porous material such as silica xerogel is held between fibers of a fiber sheet made of non-woven fabric or the like. Silica xerogel has a nano-size void structure that regulates movement of air molecules and has a low heat conductivity. A heat conductivity of heat insulating material 44 is about 0.018 W/m·K to 0.024 W/m·K. Heat insulating material 44 is useful especially as a heat insulating material used in a narrow space. The heat conductivity of heat insulating material 44 is lower than the heat conductivity of the air. Accordingly, the presence of heat transfer suppression member 40 included in battery module 1 can more effectively suppress heat transfer between batteries 12 than a case where an air layer is included as a heat insulating layer between batteries 12. Further, the heat conductivity of heat transfer suppression member 40 is much lower than a heat conductivity of separator 14.

Silica xerogel can stably maintain the structure against pressure from the outside. This makes it possible to stably maintain heat insulating performance of heat insulating material 44 irrespective of tightening in stacking direction X by restraint members 6. Accordingly, the presence of heat transfer suppression member 40 included in battery module 1 can more stably suppress heat transfer via main surfaces between batteries 12 (heat transfer indicated by arrow A in FIG. 5) than a case where an air layer is included as a heat insulating layer between batteries 12. Further, since having a lower heat conductivity than the air, heat insulating material 44 can yields a similar heat insulating effect with a thickness smaller than an air layer. It is therefore possible to suppress an increase in size of battery module 1.

Laminate film 46 is a member that wraps whole heat insulating material 44 to protect heat insulating material 44. Laminate film 46 can keep the porous material in heat insulating material 44 from dropping out of the fiber sheet. Further, a structure of heat transfer suppression member 40 in which heat insulating material 44 is coated with laminate film 46 allows heat transfer suppression member 40 to be easily adhered to separator 14. Laminate film 46 is, for example, made of polyethylene terephthalate (PET).

Heat transfer suppression member 40 has higher heat resistance than separator 14. More specifically, heat resistance of heat insulating material 44 is higher than heat resistance of separator 14. More specifically, the fiber sheet includes a fiber that has a higher melting point than separator 14 and/or the porous material is made of a substance that has a higher melting point than separator 14. For example, heat insulating material 44 has a melting point of 300° C. or higher. Specifically, the fiber sheet and/or the porous material that constitute heat insulating material 44 have a melting point of 300° C. or higher. Particularly, the fiber that constitutes the fiber sheet preferably has a melting point of 300° C. or higher. This makes it possible to maintain the state where the porous material is held by the fiber sheet even in a case where heat insulating material 44 is exposed to a high temperature.

Making the heat resistance of heat transfer suppression member 40 higher than the heat resistance of separator 14 allows heat transfer suppression member 40 to remain even in a case where separator 14 melts due to heat generated by battery 12. Accordingly, it is possible to maintain insulation between batteries 12 by heat transfer suppression member 40 even in the case where separator 14 melts. It is also possible to maintain for a longer period the state where heat transfer between adjacent batteries 12 is suppressed.

At least part of heat transfer suppression member 40 is stored in through-hole 56. In heat transfer suppression member 40 of the present exemplary embodiment, heat insulating material 44 and laminate film 46 are partly inserted in through-hole 56. Laminate film 46 has flange part 46a that overlaps a periphery of through-hole 56 when viewed from stacking direction X. Flange part 46a is in contact with a surface of first part 14c and is fixed with an adhesive or the like.

Heat transfer suppression member 40 is disposed between battery 12a and battery 12b in assembled battery module 1. One main surface of heat transfer suppression member 40 is in contact with battery 12a. The other main surface of heat transfer suppression member 40 is in contact with battery 12b. End separator 15 is disposed between end plate 4 and battery 12a adjacent to end plate 4. End separator 15 has no through-hole 56 and no heat transfer suppression member 40.

The bottom surfaces of batteries 12 are in contact with one main surface of heat absorber 60. Cooling plate 10 is in contact with the other main surface of heat absorber 60. In other words, each battery 12 is connected to cooling plate 10 via heat absorber 60 in a thermally conductive manner. Since heat transfer suppression member 40 intervenes between two adjacent batteries 12, heat transfer between the main surfaces of two batteries 12a is suppressed. Accordingly, heat generated in batteries 12 is mainly released to cooling plate 10 via heat absorber 60.

Cooling plate 10 has a larger heat capacity than battery stack 2. Thus, while battery 12 is in a normal-temperature state, heat generated in batteries 12 flows into cooling plate 10. However, for example, when a temperature of battery 12a rises excessively, heat released from battery 12a to cooling plate 10 increases excessively and locally raises cooling plate 10 to a high temperature. Then, the heat might flow back from cooling plate 10 to battery 12b.

Meanwhile, in battery module 1 according to the present exemplary embodiment, heat absorber 60 intervenes between battery stack 2 and cooling plate 10. Accordingly, for example, when battery 12a is in an overheated state, endothermic agent 62 contained in heat absorber 60 causes endothermic reaction while heat is flowing from battery 12a to cooling plate 10. In this way, since the heat released from battery 12a to cooling plate 10 is reduced, it is possible to prevent the cooling plate 10 from locally becoming a high temperature. Further, even in a case where cooling plate 10 locally becomes a high temperature, endothermic agent 62 causes endothermic reaction while heat is flowing from cooling plate 10 to battery 12b. Thus, heat transferred from cooling plate 10 to battery 12b is reduced. This configuration can suppress a temperature rise in battery 12b. In other words, the presence of heat absorber 60 disposed between battery stack 2 and cooling plate 10 can suppress heat transfer between batteries 12 via cooling plate 10 (heat transfer indicated by arrow B in FIG. 5).

Heat absorber 60 also intervenes between battery 12a that is on an outermost side in stacking direction X and end plate 4. Heat generated in battery 12a might flow via end plate 4 and cooling plate 10 into battery 12b. Meanwhile, the presence of heat absorber 60 intervening between battery 12a and end plate 4 can suppress heat transfer from battery 12a to end plate 4 (heat transfer indicated by arrow C in FIG. 5). This configuration can suppress a temperature rise in battery 12b. In other words, the presence of heat absorber 60 disposed between battery stack 2 and end plate 4 can suppress heat transfer between batteries 12 via end plate 4 and cooling plate 10.

As described above, battery module 1 according to the present exemplary embodiment includes battery stack 2 having the plurality of batteries 12 and heat transfer suppression member 40, cooling plate 10 as a heat conductor that extends in stacking direction X and is adjacent to battery stack 2, and heat absorber 60 that intervenes between battery stack 2 and cooling plate 10. Even in a case where a temperature of any battery 12 rises excessively during use of battery module 1, the configuration in which heat transfer suppression member 40 is disposed between two adjacent batteries 12 can keep heat of overheated battery 12 from transferring to adjacent battery 12 via a main surface of overheated battery 12. Therefore, a chain of overheat can be suppressed.

Meanwhile, cooling plate 10 adjacent to battery stack 2 may constitute a heat conduction path between batteries 12 as a result of the suppression of direct heat transfer between adjacent batteries 12 by heat transfer suppression member 40. Whereas, heat absorber 60 is disposed between battery 12 and cooling plate 10 to absorb heat with endothermic agent 62. This makes it possible to suppress heat transfer from overheated battery 12 to cooling plate 10 and heat transfer from cooling plate 10 to other batteries 12. Therefore, a chain of overheat can be more surely suppressed.

As described above, according to the present exemplary embodiment, it is possible to avoid performance deterioration of battery module 1 due to a chain of overheat. According to battery module 1 according to the present exemplary embodiment, even in a case where thermal runaway of battery 12 occurs, a chain of thermal runaway can be suppressed. An endothermic onset temperature of endothermic agent 62 is preferably higher than or equal to 70° C. This can suppress occurrence of endothermic reaction when a temperature of battery 12 is normal, and more surely suppress a chain of overheat. The endothermic onset temperature of endothermic agent 62 is preferably lower than or equal to 400° C., for example.

Further, in the present exemplary embodiment, it is noted that cooling plate 10 can be a heat conductor that would constitute a heat conduction path between batteries 12, and thus heat absorber 60 is disposed between battery stack 2 and cooling plate 10. Consequently, it is possible to avoid letting cooling plate 10 that has a function to cool battery 12 and is originally supposed to contribute to suppression of a chain of overheat become a cause of a chain of overheat.

In the present exemplary embodiment, heat absorber 60 also intervenes between battery stack 2 and end plate 4. This configuration can suppress heat transfer between batteries 12 via end plate 4 and cooling plate 10. Therefore, a chain of overheat can be more surely suppressed.

Separator 14 has through-hole 56 in an area overlapping battery 12 when viewed from stacking direction X of batteries 12. At least part of heat transfer suppression member 40 is stored in through-hole 56. This configuration can suppress an increase in size of battery module 1 caused by the presence of heat transfer suppression member 40. Since heat transfer suppression member 40 is supported by through-hole 56, deviation of heat transfer suppression member 40 can be prevented. Through-hole 56 can also be utilized to determine a position of heat transfer suppression member 40.

Further, a space in which at least part of heat transfer suppression member 40 is stored can be provided by through-hole 56. This configuration can keep heat transfer suppression member 40 from being excessively pressed. Especially, when including a fiber sheet, heat transfer suppression member 40 is easy to be elastically deformed. When the plurality of batteries 12 are fastened in stacking direction X by restraint members 6, heat transfer suppression member 40 may also be compressed by this fastening. Meanwhile, the presence of through-hole 56 can suppress a dimensional variation of heat transfer suppression member 40. Heat insulating performance of heat transfer suppression member 40 depends on a heat conductivity of a material constituting heat transfer suppression member 40 and a thickness of heat transfer suppression member 40. Therefore, the presence of through-hole 56 can more surely secure the heat insulating performance of heat transfer suppression member 40.

Further, laminate film 46 of heat transfer suppression member 40 has flange part 46a that overlaps a periphery of through-hole 56. The presence of flange part 46a can increase a contact area between heat transfer suppression member 40 and separator 14. This configuration allows heat transfer suppression member 40 to be more surely fixed to separator 14. Additionally, since the periphery of through-hole 56 is sealed by flange part 46a, it is possible to keep dew condensation water and the like from entering through-hole 56.

Second Exemplary Embodiment

Figure 6:
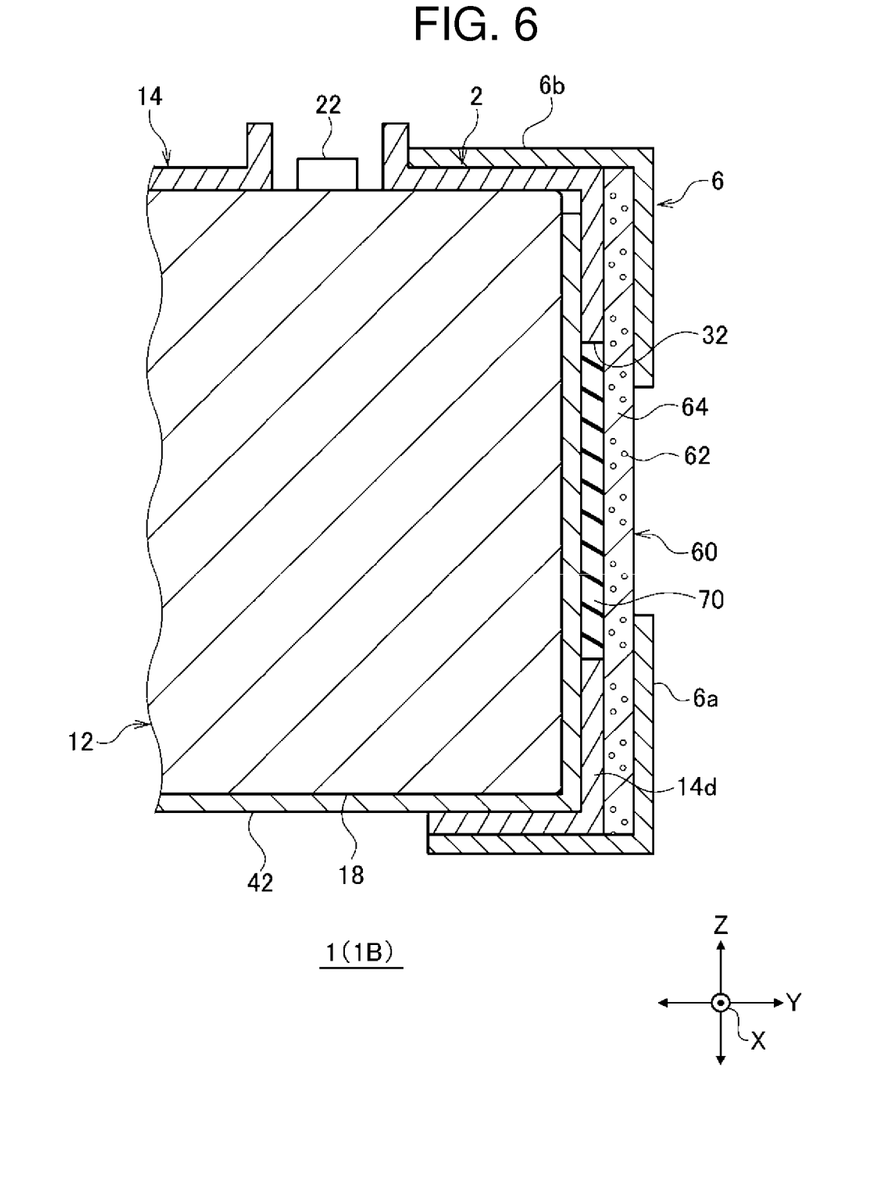
FIG. 6 is a cross-sectional view schematically illustrating a part of a battery module according to a second exemplary embodiment.

A battery module according to a second exemplary embodiment shares a configuration with the battery module of the first exemplary embodiment except for a dissimilarity in position of heat absorber 60. Hereinafter, a configuration of the battery module according to the present exemplary embodiment that is different from the configuration of the first exemplary embodiment will be mainly described. A common configuration will be simply described, or will not be described. FIG. 6 is a cross-sectional view schematically illustrating a part of the battery module according to the second exemplary embodiment. FIG. 6 does not illustrate an internal structure of battery 12, cover 8, and cooling plate 10.

Battery module 1 (1B) mainly includes battery stack 2 having a plurality of batteries 12, a plurality of separators 14, and a plurality of heat transfer suppression members 40, a pair of end plates 4, a pair of restraint members 6, cover 8, cooling plate 10, and heat absorber 60.

Restraint member 6 is a heat conductor that extends in stacking direction X of batteries 12 and is adjacent to battery stack 2. In the present exemplary embodiment, heat absorber 60 intervenes between restraint member 6 and battery stack 2. This configuration can suppress heat transfer from overheated battery 12 to restraint member 6 and heat transfer from restraint member 6 to other batteries 12. In other words, the presence of heat absorber 60 disposed between battery stack 2 and restraint member 6 can suppress heat transfer between batteries 12 via restraint member 6. Therefore, it is possible to suppress a chain of overheat and avoid performance deterioration of battery module 1.

Heat absorber 60 also intervenes between end plate 4 and battery stack 2 as in the first exemplary embodiment. This configuration can suppress heat transfer between batteries 12 via end plate 4 and restraint member 6.

Further, insulator 70 made of polycarbonate (PC) or the like preferably intervenes between battery 12 and heat absorber 60. Insulator 70 is fit in cutout 32 of separator 14, for example. This configuration can further enhance an insulation property of battery 12. Positions of insulator 70 and heat absorber 60 may be reversed. In other words, heat absorber 60 may be disposed closer to battery 12 than insulator 70, and insulator 70 may be disposed closer to restraint member 6 than heat absorber 60.

The present invention is not limited to the exemplary embodiments described above. The exemplary embodiments may be combined. Alternatively, further modification, such as various design changes, may be added to the exemplary embodiments based on knowledge of the person of ordinary skill in the art. The combined or modified exemplary embodiments also fall within the scope of the present invention. New exemplary embodiments obtained by combining the above-described exemplary embodiments or adding modification to the exemplary embodiment respectively have effects of the combined exemplary embodiments or the modification.

Heat absorber 60 may be disposed both between cooling plate 10 and battery stack 2, and between restraint member 6 and battery stack 2. Heat conductors for which heat transfer suppression measures are implemented by heat absorber 60 are not limited to cooling plate 10 and restraint member 6. The heat conductors may include any member that extends in stacking direction X of batteries 12, is adjacent to battery stack 2, and has a possibility of inflow of heat from battery 12.

In the above-mentioned exemplary embodiments, heat transfer suppression member 40 is fit in through-hole 56 of separator 14. However, heat transfer suppression member 40 is not particularly limited to this configuration. For example, separator 14 has no through-hole 56 in first part 14c and heat transfer suppression member 40 may be fit to a main surface of first part 14c. Alternatively, heat transfer suppression member 40 may be fit to a main surface of battery 12. In this case, heat transfer suppression member 40 may be disposed inside insulating film 42, in other words, between exterior can 18 and insulating film 42, or disposed outside insulating film 42. Separator 14 may be constituted by integrally molding a resin base including first part 14c and second part 14d and heat transfer suppression member 40. Alternatively, separator 14 may be omitted and heat transfer suppression member 40 may have a function as separator 14.

In the above-described exemplary embodiments, battery 12 is a prismatic battery. However, a shape of battery 12 is not particularly limited and may be cylindrical, for example. Further, a number of batteries 12 included in battery stack 2 is not particularly limited. Battery 12 does not necessarily include insulating film 42.

Any combinations of the above-described configuration elements, and converted expressions of the present invention in method, apparatus, system and the like are also effective as aspects of the present invention.

REFERENCE MARKS IN THE DRAWINGS

1: battery module
2: battery stack
4: end plate
6: restraint member
10: cooling plate
12, 40: heat transfer suppression member
60: heat absorber
62: endothermic agent

The invention claimed is:

1. A battery module comprising:
a battery stack having a plurality of batteries that are stacked and a heat transfer suppression member disposed between adjacent two of the batteries;
a heat conductor that extends in a stacking direction of the batteries and is adjacent to the battery stack;
a pair of end plates disposed at both ends of the battery stack in the stacking direction; and
a heat absorber that intervenes between the battery stack and the heat conductor and contains an endothermic agent that is to start endothermic reaction at a temperature higher than or equal to a predetermined temperature, so that conduction of heat from the heat absorber to the battery stack is reduced by the endothermic agent causing the endothermic reaction,
wherein the heat absorber is made of a heat conductive material including at least one of silicon rubber, silicon gel, acrylic rubber, or acrylic gel, and
wherein the heat absorber intervenes between the battery stack and one of the pair of end plates.

2. The battery module according to claim 1, wherein the heat conductor is at least one of a cooling plate that cools the plurality of batteries and a restraint member that holds the plurality of batteries from both sides.

3. The battery module according to claim 1, wherein the heat conductive material has a heat conductivity of 1.5 W/m·K or higher and the endothermic agent is filled in the heat conductive material.

4. The battery module according to claim 1, wherein the heat transfer suppression member includes a heat insulating material and a laminate film.

5. The battery module according to claim 4, wherein a heat conductivity of the heat insulating material is 0.018 W/m·K to 0.024 W/m·K.

6. The battery module according to claim 1, wherein each of the plurality of batteries is connected to the heat conductor via the heat absorber in a thermally conductive manner.

7. The battery module according to claim 3, wherein the endothermic agent is aluminum hydroxide, sodium hydrogen carbonate, or magnesium hydroxide.

8. The battery module according to claim 1, wherein the heat conductive material includes silicon rubbers or gel having a heat conductivity of 2 W/m·K or higher.

9. The battery module according to claim 1, wherein the heat conductive material includes acrylic rubbers or gel having a heat conductivity of 1.5 W/m·K or higher.

10. The battery module according to claim 1, wherein the heat absorber is a flat-plate-like member.

11. The battery module according to claim 1, wherein the heat absorber covers center of the heat conductor.

* * * * *